F. S. MARTIN.
INDUCTION MOTOR WINDING.
APPLICATION FILED MAY 22, 1911.

1,191,209.  Patented July 18, 1916.

WITNESSES:
Fred H Miller

INVENTOR
Frederick S. Martin
BY
ATTORNEY

UNITED STATES PATENT OFFICE.

FREDERICK S. MARTIN, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

INDUCTION-MOTOR WINDING.

1,191,209. Specification of Letters Patent. Patented July 18, 1916.

Application filed May 22, 1911. Serial No. 628,741.

*To all whom it may concern:*

Be it known that I, FREDERICK S. MARTIN, a citizen of the United States, and a resident of Edgewood Park, in the county of Allegheny and State of Pennsylvania, have invented a new and useful Improvement in Induction-Motor Windings, of which the following is a specification.

My invention relates to the windings of dynamo-electric machines and particularly to secondary windings for induction motors.

The object of my invention is to provide a secondary winding of the squirrel-cage type that shall be particularly simple in construction and easy to wind and one that shall comprise a plurality of short-circuited coils and means for holding the end portions of the coils in position under high-speed operating conditions.

According to my present invention, I provide a plurality of slotted strips of conducting material, having notches at their ends which are spread into short circuited coils of diamond shape and are wound in suitable slots in the core member of a dynamo-electric machine. After the coils are in position, I insert a pair of clamping end rings in the coil notches and bend the ends of the coils to partially inclose the end rings and hold them in position.

Figure 1:
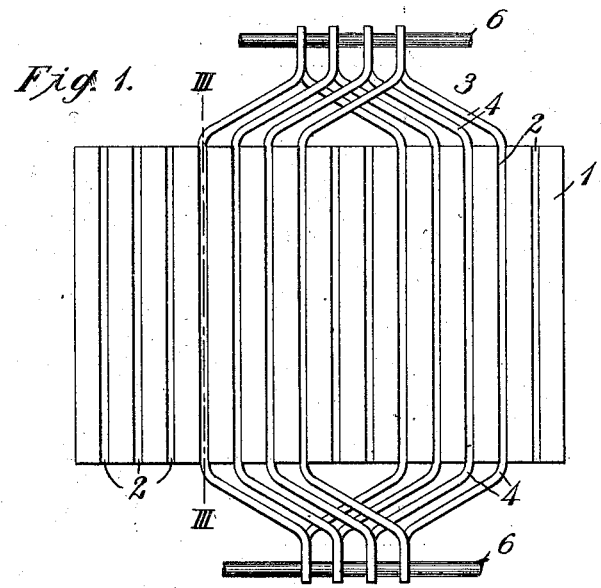
Figure 2:
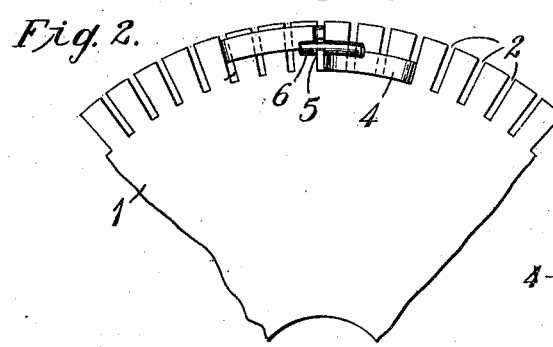
Figure 3:
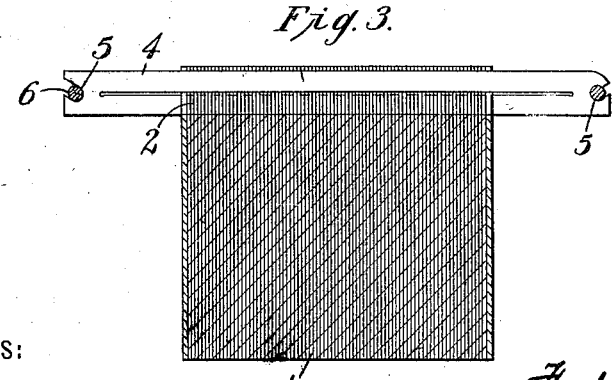

Figure 1 of the accompanying drawings is a plan view and Fig. 2 is an elevation of a portion of the secondary member of a dynamo-electric machine having a winding constructed and arranged in accordance with my invention. Fig. 3 is a sectional elevation on the line III—III of Fig. 1 and Fig. 4 is a detail view, on a larger scale, showing one end of a coil having a slightly modified arrangement of end notches.

Referring to Figs. 1, 2 and 3 of the drawings, a substantially cylindrical laminated core member 1 is provided with peripheral slots 2 in which a winding 3 is located. The winding 3 is composed of a number of single-turn short circuited coils 4 of diamond shape, each of which is produced by spreading the two sides of a slotted strip or ribbon of conducting material. The ends of the strips are provided with notches 5 in which a binding ring is located when the coils are assembled in position, as shown in Fig. 3. The two sides of the spread coil are respectively located in the outer and inner portions of slots that correspond to the width of the coil, as clearly shown in Fig. 2, the coils overlapping in the completed winding in the usual manner for windings composed of diamond shaped coils.

The ends of each coil are bent around binding rings or wires 6, after the wires are in position, to hold them in place, the slots being preferably inclined inwardly toward the core axis to assist in preventing the wires from slipping out. In order to draw the ends of the coils inwardly and avoid possibility of their conflicting with the stationary parts of the motor or other machine of which they form parts, the rings or wires 6 may be shrunk into place.

Figure 4:
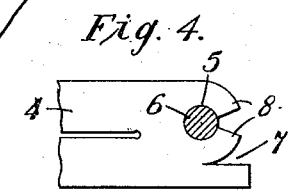

The ends of the coils may be provided with notches 7, as shown in Fig. 4 of the drawings, in addition to the notches 5 in which the ring or wire is located, to provide corresponding opposing projections 8 to be bent toward each other around the wires.

The rings or wires 6 are formed of conducting material and assist in producing the effect of a squirrel cage winding by acting as short circuiting end rings, although it is not essential that any electrical connections shall be established between the coils.

While the binding rings are shown as circular in cross section, I do not wish to be limited to this particular form and various changes in details may be effected within the spirit and scope of my invention.

I claim as my invention:

1. In a winding for dynamo-electric machines, the combination with a plurality of conductors having portions thereof spread apart and having notched ends, of binding rings seated in the notches and clamped therein by upset portions of the ends of the conductors.

2. A winding for dynamo-electric machines comprising a plurality of diamond-shaped coils having notched ends and binding rings seated in the notches and clamped therein by upset portions of the ends of the coils.

3. A winding for dynamo-electric machines comprising a plurality of overlapping short circuited diamond-shaped coils having notched end projections and binding rings seated in the notches and clamped therein by upset portions of the ends of the coils.

4. A dynamo-electric machine comprising a substantially cylindrical core member having peripheral slots, coils located in said slots and having notches in their ends that are inclined toward the center of the core and binding rings seated in the notches and clamped therein by upset portions of the ends of the conductors.

5. A winding for dynamo-electric machines comprising a plurality of overlapping short circuited diamond-shaped coils having end notches inclined toward the center of the winding and binding rings seated in the notches and clamped therein by upset portions of the ends of the coils.

6. In a winding for dynamo-electric machines, the combination with a plurality of conductors having portions thereof spread apart and having notched ends, of rings seated in the notches for holding the ends of the conductors in position, the ends of the conductors being bent around the rings.

7. A winding for dynamo-electric machines comprising a plurality of overlapping short circuited diamond-shaped coils having notched ends and binding rings seated in the notches to hold the ends of the coils in position, the ends of the conductors being bent around the binding ring.

8. A winding for a dynamo-electric machine comprising overlapping coils having notches in their ends and rings seated in said notches and clamped therein by inwardly bent portions of the coil ends.

9. A dynamo-electric machine comprising a substantially cylindrical core member having a plurality of peripheral slots, a plurality of overlapping diamond-shaped coils located in said slots and having notches in their ends that are inclined toward the center of the core, and binding rings of circular cross section seated in the notches and clamped therein by upset portions of the ends of the coils.

In testimony whereof, I have hereunto subscribed my name this 17th day of May, 1911.

FREDERICK S. MARTIN.

Witnesses:
C. N. STARKER,
B. B. HINES.